United States Patent [19]

Staufenberg, Jr. et al.

[11] Patent Number: 4,727,278
[45] Date of Patent: Feb. 23, 1988

[54] PIEZOELECTRIC MULTIAXIS MICROPOSITIONER

[75] Inventors: Charles W. Staufenberg, Jr.; Robert J. Hubbell, both of Santa Barbara, Calif.

[73] Assignee: Micro Pulse Systems, Inc., Santa Barbara, Calif.

[21] Appl. No.: 6,022

[22] Filed: Jan. 22, 1987

Related U.S. Application Data

[63] Continuation-in-part of Ser. No. 784,476, Oct. 4, 1985, abandoned.

[51] Int. Cl.⁴ .............................................. H01L 41/08
[52] U.S. Cl. ...................................... 310/328; 310/317
[58] Field of Search ......................... 310/317, 323, 328

[56] References Cited

U.S. PATENT DOCUMENTS

| | | | |
|---|---|---|---|
| 4,408,832 | 10/1983 | Hartman et al. | 310/328 X |
| 4,422,002 | 12/1983 | Binning et al. | 310/328 |
| 4,523,120 | 6/1985 | Assard | 310/328 X |

FOREIGN PATENT DOCUMENTS 0569980  8/1977  U.S.S.R. ............................ 310/328

*Primary Examiner*—Mark O. Budd
*Attorney, Agent, or Firm*—Daniel J. Meaney, Jr.

[57] ABSTRACT

An electromechanical translation apparatus comprising a driven member which is adapted to be incrementally moved in a selected direction, and a piezoelectric multiaxis micropositioner adapted to produce incremental movement of the driven member in the selected direction wherein the micropositioner includes a mounting means, at least one piezoelectric driver assembly having a housing, an engaging member formed of a hard material having a selected driving end at one end thereof and a driven end at the other end wherein the engaging member's one end is positioned to selectively engage and translate said driven member in response to a driving force, and at least three piezoelectric driver elements positioned between the driven end of the engaging member and the housing wherein the piezoelectric driver elements are positioned in a spaced, angular relationship to the others and wherein each piezoelectric driver element is capable of separately responding to an electrical signal having a predetermined frequency and amplitude which varies between a first polarity and second polarity to expand and contract to change its geometrical dimension to apply a driving force on the engaging member which imparts an incremental movement to the driven member in the selected direction is shown. The use of an electromechanical translation apparatus as a piezoelectric multiaxis micropositioner for incrementally rotating a sphere having an optical element affixed thereto for use in an optical path is also shown.

33 Claims, 26 Drawing Figures

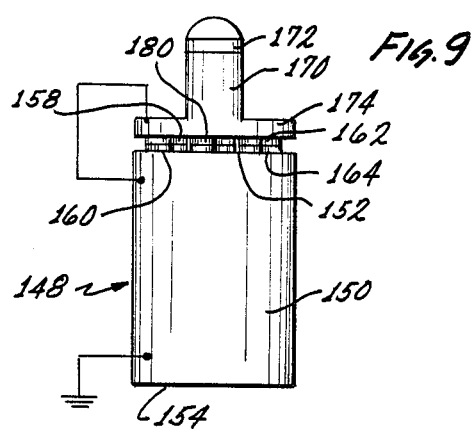
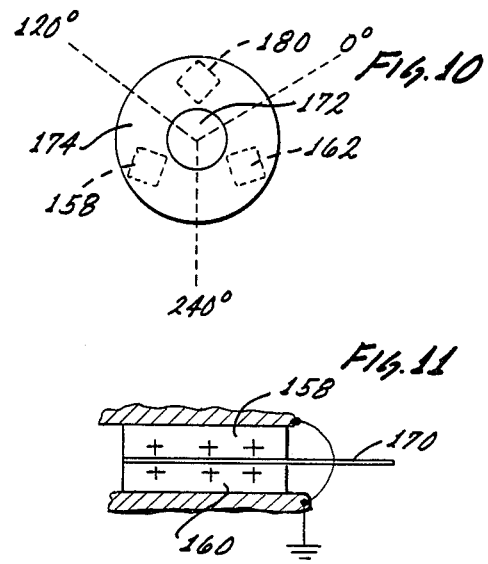
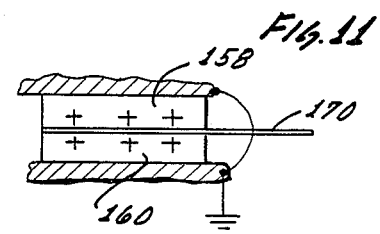
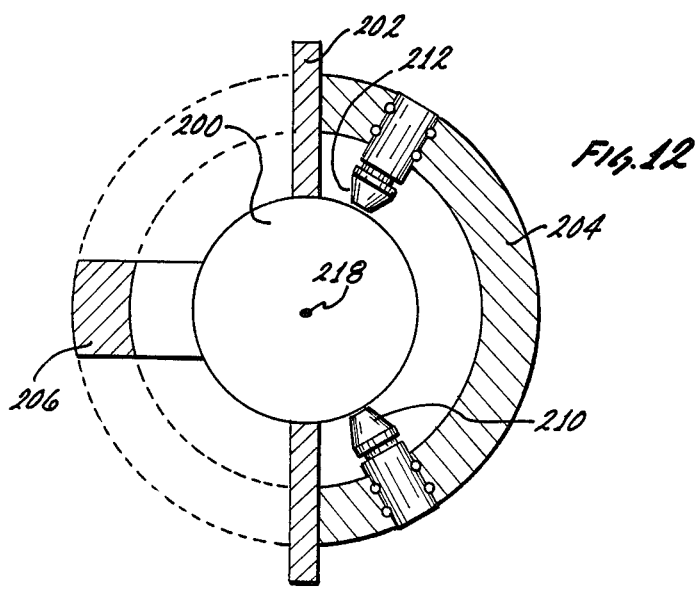
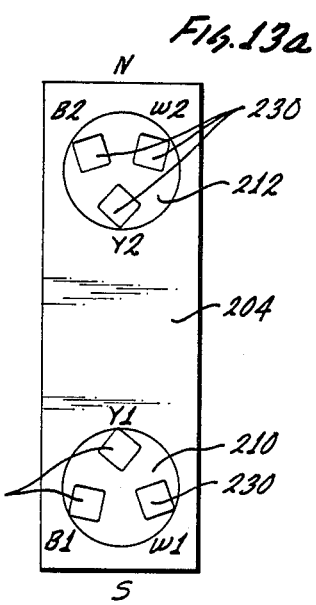
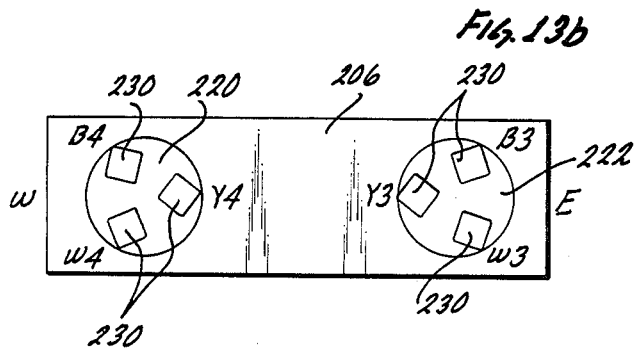

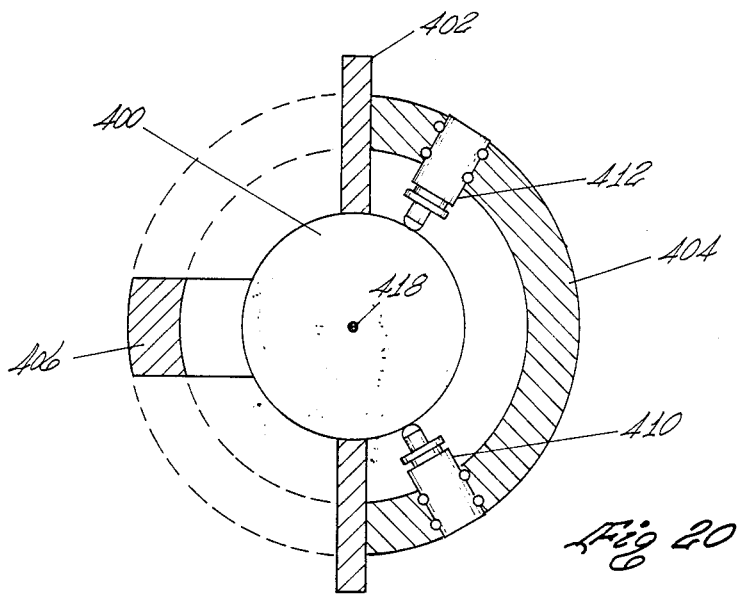
_Fig 20_
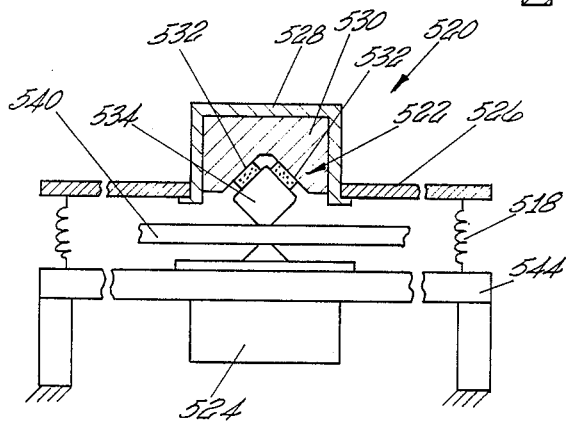
_Fig 21_
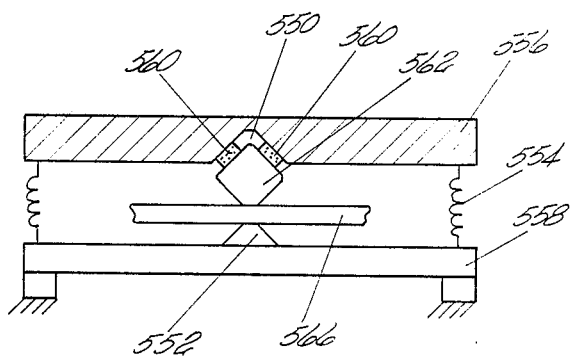
_Fig 22_
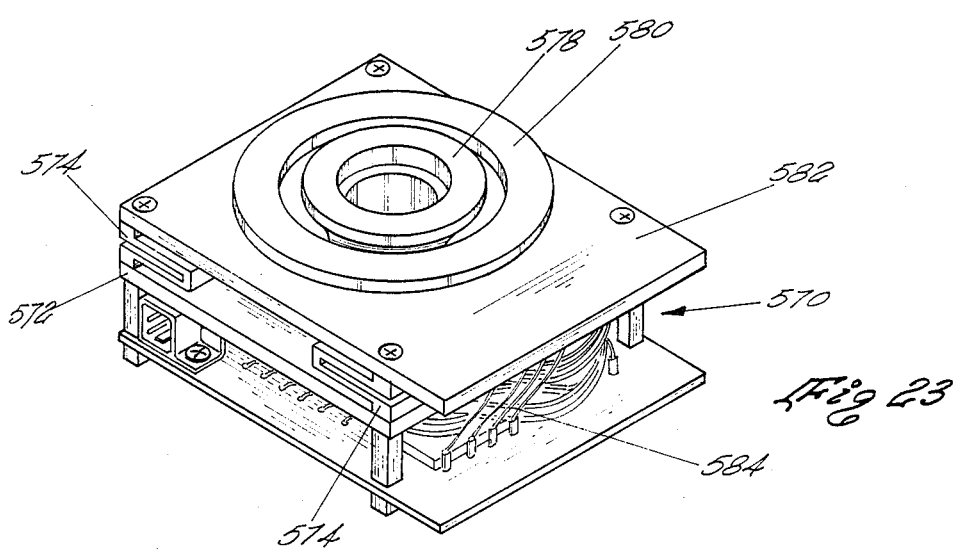
_Fig 23_

PIEZOELECTRIC MULTIAXIS MICROPOSITIONER

BACKGROUND OF THE INVENTION

1. Field of the Invention

This invention relates to an electromechanical translation apparatus and more particularly to a piezoelectric translation apparatus used as a piezoelectric multiaxis micropositioner wherein piezoelectric driver assemblies selectively incrementally advance a means defining a driven member, such as a spherical segment or planar member, in a selected direction over a predetermined path in incremental, programmed steps. The preferred embodiment of the piezoelectric translation apparatus is to incrementally adjust a planar mirror affixed to a spherical member to control the angle of deflection in an optical path.

2. Description of the Prior Art

The concept of a piezoelectric motor or an electromechanical device to produce rotational or linear relative movement between an electromechanical device and a driven member is known in the art.

A reversible motor with a piezoelectric rotor drive having a two-tier piezoelectric driving transducer which is driven by an oscillator and a phase shifter for high speed reverse operation is disclosed in Russian Pat. No. SU-651-434. In this reversible motor, the two-tier transducer is arranged in a coplanar, stacked arrangement and has a common electrode in the adjacent opposed surfaces. The outer surface of each piezoelectric element has an electrode affixed thereto. An oscillator drives one piezoelectric element in contact with a shaft in a first direction and a second piezoelectric element, which is coupled to a housing and which supports the shaft for rotation, is driven by a phase shifter in a second direction producing relative movement between the shaft and housing which rotates the shaft. In this motor, the piezoelectric element directly clamps the exterior surface of the shaft.

A unidirectional piezoelectric motor having a wedge-shaped driving element which frictionally engages the exterior surface of a shaft to rotate the same in response to vibrations of a piezoelectric element coupled between the wedge-shaped driving element and housing which rotatably supports the shaft is disclosed in Russian Pat. No. SU-635-538.

The use of a piezoelectric electromechanical translation apparatus using a multi-section, axially aligned piezoelectric driver to produce linear motion between the piezoelectric electromechanical translation apparatus and a shaft is disclosed in U.S. Pat. Nos. 3,902,084 and 3,902,085. In each of these apparatus, the piezoelectric driver directly engages and clamps the shaft through electrodes formed on the surface of piezoelectric crystals in order to produce incremental, stepped movement between the apparatus and the shaft.

A piezoelectric motor for producing angular motion which is capable of being transmitted to a remotely disposed rotatable element wherein polyphase electric potentials are applied to a plurality of piezoelectric crystal elements which are so arranged and interconnected that the vibratory movements thereof are translated into the rotational movement is disclosed in U.S. Pat. No. 2,439,499.

A dynamic balancing machine for detecting the periodic forces of unbalance of a rotary body and yielding a visual or other indication of the magnitude and orientation of such forces utilizing a means for supporting each end of a rotating body to be tested upon a pair of piezoelectric quartz crystal plates as the pickup elements which are arranged in a "V" shaped support is disclosed in U.S. Pat. No. 2,461,645.

Another piezoelectric driving device having an elongated piezoelectric driving bar which is resiliently mounted to drive an intermediate rotor in response to vibrations of the piezoelectric crystal and wherein the intermediate rotor drives a main rotor is disclosed in Russian Pat. No. SU-636-760.

An electrical rotary apparatus utilizing four piezoelectric elements which are supported radially from and in an equally spaced relationship on a circular shaped housing and which are adapted to be expanded, in response to a magnetic field, to engage a shaft and wherein application of a AC signal to the piezoelectric element while in contact with the shaft causes relative movement between the housing and the shaft is disclosed in Russian Pat. No. SU-688-033.

U.S. Pat. No. 3,377,489 discloses a position control device which utilizes a piezoelectric material which, when subjected to an electrical potential, results in mechanical distortion of the material which is exhibited in either torsional movement or a variation of dimension. This patent also discloses that, in operation, one portion of the piezoelectric material is held in position during application of a voltage to cause mechanical distortion of the other portions. Thereafter, the moved or distorted portions of the material are locked into their distorted positions. Following the release of the first held portion and removal of the noted potential, the piezoelectric material reverts to its normal, nondistorted condition, but in a different location. The incremental movement of the piezoelectric material from one location to another may be used for accurate positioning functions.

U.S. Pat. No. 3,292,019 discloses a transducer which includes a piezoelectric member which is responsive to an alternating voltage potential being applied thereto causing an oscillatory motion of the piezoelectric member with a one-way clamp on either side of the expansion and contraction due to the oscillatory motion so that the expansion is permitted in one direction only due to clamping one end of the oscillating member and the contraction also results in movement in the same direction due to clamping of the other end of the oscillatory member.

U.S. Pat. No. 3,649,856 discloses a transducer for converting digital signals into linear motion. In the embodiment disclosed in this patent, the transducer is formed of a hollow cylinder made of ferroelectric ceramic material which is made to have piezoelectric properties. The cylinder will move along the inside wall of a linear tube in response to a voltage pattern commutated through annular rings on the inside of the hollow cylinder such that the voltage on a given ring increases in steps to a maximum and then decreases, with the result that the hollow cylinder contracts in circumferential and axial dimensions in annular sections progressively from one end to the other end in a direction of desired motion as the voltage pattern is commutated in that direction. A predetermined motion is achieved by one cycle of commutation. For further motion, the voltage pattern is commutated through additional cycles.

U.S. Pat. No. 3,684,904 discloses a device for precision displacement of a solid body with respect to a bearing surface wherein the device includes at least two supports of elastic material and each of the supports is originally fixed at one end thereof to a displaceable solid body. At least two drive means are provided for ensuring independent movement of the ends of each support, both in a direction perpendicular to the bearing surface in the direction of movement of the solid body.

U.S. Pat. No. 3,217,218 discloses an alternating energy control system which illustrates at FIG. 5 thereof an embodiment which utilizes a magnetostrictive rod. As shown in said FIG. 5, the magnetostrictive rod changes its dimension under the influence of a strong magnetic field, and it is the magnetostrictive rod which is an element to be moved incrementally. Movement is incurred by use of clamping members which are located at each end of the magnetostrictive rod. By controlling the clamping or relaxing of the various clamping members, and by controlling the application of an alternating electric current through a winding extending around the exterior of the magnetostrictive rod, the magnetostrictive rod is expanded. If one of the clamped pairs is energized at the beginning of an expansion portion of a cycle and the other clamped pair is energized at the end of the expansion portion, holding the rod clamped at both ends in its extended condition, then the rod can be made to move in either direction by selectively releasing one of the pairs of clamps before the field collapse as the electric current reaches its maximum value. By controlling the relationship between the application of the voltage to the winding and the clamping and releasing of the various clamped pairs, movement of the magnetostrictive rod in a selected direction can be achieved.

SUMMARY OF THE INVENTION

The present invention relates to a novel, unique and improved electromechanical translation apparatus which includes a piezoelectric multiaxis micropositioner which is capable of selectively incrementally moving a means which defines a driven member along a selected path. In the preferred embodiment, the means defining the driven member may be a sphere having an optical element affixed thereto, such as a planar mirror, which is adapted to controllably adjust the angle of deflection of an optical path or to am a laser beam by deflection of the planar mirror.

The piezoelectric translation apparatus of the present invention includes a piezoelectric multiaxis micropositioner which is adapted to incrementally move a means for defining a driven member in a selected direction. If the means defining the driven member is a planar member, movement thereof can be controlled on any axis within the plane of the planar member, such as along the X and Y axes, or can be rotated about any axis normal to the plane of the planar member. If the means defining a driven member is a sphere, it can be rotated in a selected direction about about any one of two or more axes, such as X, Y and Z axes, defined with respect to the geometrical center of the sphere. The piezoelectric multiaxis micropositioner includes a mounting means positioned in a spaced relationship from the driven member. The piezoelectric multiaxis micropositioner includes a housing which is operatively coupled to the mounting means and at least one piezoelectric driver assembly having an engaging member formed of a hard material which has a selected driving end at one end thereof and a driven end formed on the end opposite to the one end having the selected driving end. The selected driving end of the engaging member is positioned to selectively engage and translate the driven member. At least three piezoelectric driver elements are positioned between the housing and the driving end of the engaging member. The three piezoelectric driver elements are positioned in a predetermined angular relationship to each other. Each piezoelectric driver element is capable of responding to an applied electrical signal having a predetermined frequency and an amplitude which varies between a first polarity and second polarity to expand and contract to change its geometrical dimensions. Each of the piezoelectric driver elements is responsive to an electrical signal having an amplitude of a first polarity to urge the engaging member into driving engagement with said means defining the driven member to apply a driving force thereto in a predetermined direction. Each of the piezoelectric driver elements is responsive to an electrical signal having an amplitude of a second polarity to withdraw the at least one engaging member from driving engagement with the means defining the driven member. Means are operatively coupled to each of the three piezoelectric driver elements for selectively applying the electrical signal to each of the three piezoelectric driver elements to expand and contract one or more at the same time. Thus, the electromechanical translation apparatus is responsive to the electrical signals being selectively applied to one or more of the three piezoelectric driver elements to develop a driving force on the means defining a driven member to incrementally translate the same in a selected direction along one of two or more predetermined axes.

None of the known prior art devices utilize three piezoelectric driver assemblies mounted in an angularly disposed relationship with each other and wherein each of the piezoelectric driver assemblies includes three piezoelectric driver elements which are coupled to an engaging member and which are adapted to simultaneously engage and translate a member in a predetermined direction along a predetermined path. Further, none of the known prior art devices is capable of utilizing a piezoelectric multiaxis micropositioner for translating a planar member in a selected direction along any line in the plane of the planar member or for selectively incrementally rotating the planar member about an axis normal to the plane of the planar member.

Also, the prior art does not teach, suggest or disclose a piezoelectric multiaxis micropositioner which is used with a sphere or spherical segment to rotate the same in incremental steps as small as seconds of arc to selectively rotate the sphere or spherical segment on any axis, such as an X, Y and Z axis, the coordinates of which commence at the geometrical center of the spherical segment or sphere. In use, the sphere could be rotated about any selected axis.

One advantage of the present invention is that the piezoelectric translation apparatus can programmably control the angular motion of a spherical segment or of a sphere in very small incremental steps in the order of a second of arc.

Another advantage of the present invention is that the piezoelectric translation apparatus can be utilized to selectively control the rotation on any selected axis of a spherical member with an optical element such as, for example, a planar mirror affixed thereto which is adapted to receive and/or deflect or aim a laser beam at a controllable and selectable angle of deflection.

A yet further advantage of the present invention is that the piezoelectric translation apparatus can be utilized to incrementally transport a planar member in a predetermined direction along any axis in its plane or rotate it about any axis normal to the plane. By programming a control means which generates electrical signals at a predetermined frequency and having an amplitude which varies between a first and a second polarity, the direction of incremental translation and the magnitude or aggregate movement of the planar member can be programmed into the control means to obtain precision translation and rotation of the surface member in its plane.

A further advantage of the present invention is that the piezoelectric multiaxis micropositioner can be utilized in cooperation with a thin-walled segment or spherical segment member having a planar mirror affixed thereto wherein the piezoelectric driver elements can urge an engagement member into contact with the segment member to incrementally rotate the same in a selected direction about any one of two or more predetermined axes to change the deflection of the mirror in an optical path.

A still further advantage of the present invention is that piezoelectric translation apparatus piezoelectric driver assemblies can be positioned to drive a thin-walled segment member having an outer polished surface which may have a planar mirror affixed thereto wherein the driving force is applied to the outer surface or, in the alternative, to translate the thin-walled segment member by contacting and driving a smooth inside surface of the thin-walled segment member.

Another advantage of the present invention is that the power source adapted for producing electrical signals can be selected to have a predetermined frequency and to specifically control the amplitude of the signal such that, at certain predetermined frequencies and certain predetermined amplitudes, the translation characteristics of the piezoelectric driver elements can be precisely known and controlled.

A further advantage of the present invention is that the teachings hereof can be applied to an adjustable spherical deflecting apparatus which utilizes a sphere having a polished outer surface and which has a planar reflecting surface affixed thereto wherein the sphere is positioned within a mounting means containing the piezoelectric driver assemblies to provide an integrated deflection apparatus capable of use for optics, laser beam applications, and the like.

A yet further advantage of the present invention is that the teachings hereof can be integrated into a precision deflecting system which is adapted to deflect the direction of an optical path or the direction of a laser beam in incremental steps wherein each step is in the order of an arc-second.

Another advantage of the present invention is that the precision deflecting system which incorporates the teachings of this invention can further include a programmable control means which includes an input means for programming the programmable control means such that the electrical signals are applied to the piezoelectric translation apparatus to program rotation enabling a mirror affixed to the sphere to deflect a beam along a selected variable angle and along a predetermined path.

BRIEF DESCRIPTION OF THE DRAWINGS

These and other advantages of the invention, together with its various features, will become apparent from the following detailed description of the preferred embodiment when taken in conjuction with the following drawings which include the following figures:

FIG. 9 is a pictorial representation of one of the piezoelectric driver assemblies of FIG. 6;

FIG. 10 is a pictorial representation of a piezoelectric driver assembly illustrating the position of the piezoelectric driver elements arranged in a circular pattern and in a spaced, equiangular relationship to each other;

FIG. 11 is a pictorial representation of a piezoelectric driver element using two piezoelectric plates in the commonly used center tap connections, in which poles of like polarity face the center connection;

FIG. 12 is a pictorial representation partially in cross section of a spherical adjusting means utilizing a piezoelectric translation apparatus having two support arms which are positioned at right angles to each other for incrementally rotating a sphere;

FIGS. 13(a) and 13(b) are pictorial representations of the first and second support arms of the apparatus of FIG. 12 having piezoelectric driver assemblies located near the ends thereof;

FIG. 20 is a pictorial representation, partially in cross-section, of a spherical adjusting means utilizing a piezoelectric translation apparatus having piezoelectric driver assemblies as illustrated in FIG. 9, and wherein the apparatus has two support arms which are positioned at right angles to each other for incrementally rotating a sphere;

FIG. 21 is a pictorial representation, partially in cross-section, showing a piezoelectric translation apparatus having six piezoelectric driver assemblies, two of which are shown, and a spring to establish a loading force between the fixed plate and the loading plate such that piezoelectric translation apparatus can be operated in any position without relying on gravity to maintain contacts at the driver points;

FIG. 22 is a pictorial representation, partially in cross-section, showing another embodiment of a piezoelectric translation apparatus wherein the piezoelectric driver assemblies, two of which are shown, are integral with the fixed and loading plates and a spring is used to establish a loading force between the fixed plate and the loading plate such that piezoelectric translation apparatus can be operated in any position without relying on gravity to maintain contacts at the driver points;

FIG. 23 is a perspective view of another embodiment of a piezoelectric translation apparatus wherein a center hub adapted to receive and support a load which is adapted to be rotated in the plane of and coaxially with an adjacent protective annular ring;

DESCRIPTION OF THE PREFERRED EMBODIMENT

Figure 1:
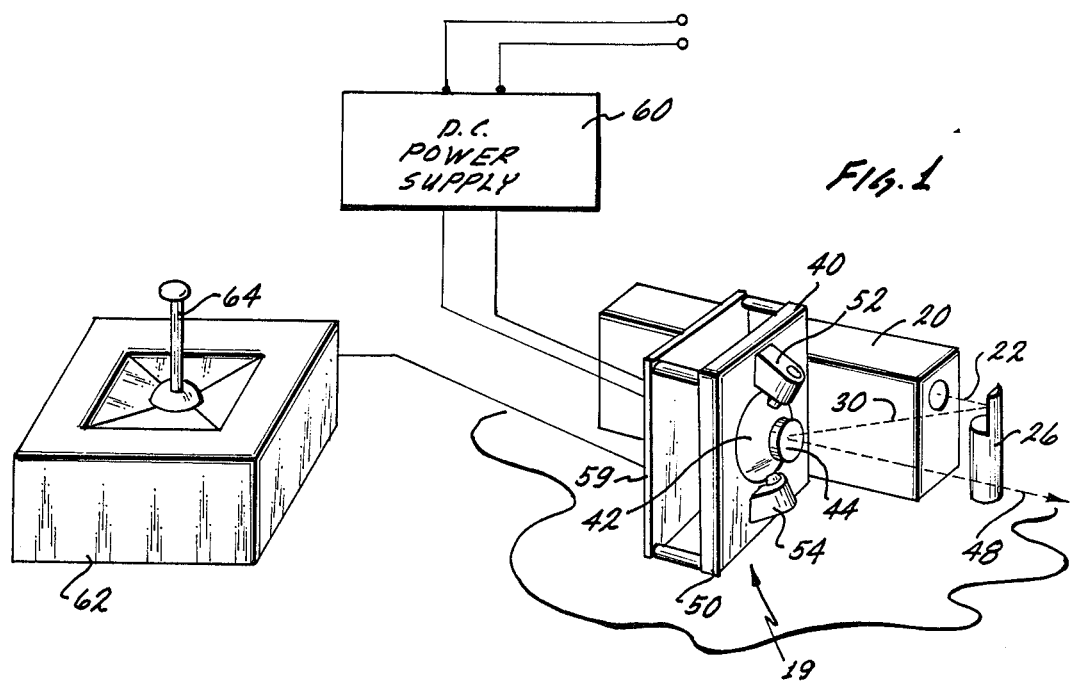
FIG. 1 is a perspective showing of a piezoelectric multiaxis micropositioner showing that the preferred embodiment of this invention is used for precise aiming of a laser beam.

FIG. 1 illustrates the preferred embodiment of using a piezoelectric multiaxis micropositioner 19 of the present invention. Specifically, FIG. 1 illustrates a precision deflecting system which is adapted to controllably aim a laser beam in incremental steps wherein each step is a fraction of a minute of arc. A source of coherent radiation 20 produces a radiation beam illustrated as beam 22. The source of radiation 20 has a predetermined frequency and directs the radiation beam at said frequency along a fixed first predetermined path 22. In the embodiment of FIG. 1, the optical path includes a means defining a folded optical path having a post-mounted relay mirror 26 which intercepts and deflects the radiation beam 22 at a predetermined angle as illustrated by beam 30. An adjustable spherical deflecting apparatus shown generally as 19 is located along the predetermined path for intercepting the radiation beam 30. The adjustable spherical deflecting apparatus includes a sphere 42 having a planar mirror 44 affixed thereto and rotatable therewith for selectively aiming the radiation beam along a path illustrated by beam 48. The mirror 44 affixed to the sphere 42 of the adjustable spherical deflecting apparatus 19 selectively reflects the coherent radiation beam 48 along a variable angle second predetermined path.

As illustrated in FIG. 1, the adjustable spherical deflecting apparatus 19 encloses a sphere 42 having a polished outer surface which has the planar mirror 44 attached thereto which functions as a deflector for the optical path. A mounting means 50 is positioned in a predetermined spaced relationship from the sphere 42. The adjustable spherical deflecting apparatus preferably includes at least four piezoelectric driver assemblies, of which piezoelectric driver assemblies 52 and 54 are visible in FIG. 1. The piezoelectric driver assemblies are positioned in a predetermined spaced pattern relative to and in releasable engagement with the sphere 42. The four piezoelectric driver assemblies define a four-point support system in order to suspend the sphere 42 and to permit incremental movement thereof and the mirror 44 about the geometrical center of the sphere 42.

The adjustable spherical deflecting apparatus 19 has four piezoelectric driver assemblies, each of which includes three piezoelectric driver elements.

A programmable control means includes a power supply 60 and a printed circuit board 59 with components for generating the electrical signals which are selectively applied to the piezoelectric driver assemblies, of which 52 and 54 are typical. The control means further includes input means 62 which is in the form of a so-called "joy stick" control, which includes a joy stick 64 for programming the programmable control means to selectively apply electrical signals to the piezoelectric driver elements of each piezoelectric driver assembly. The input means 62 programs the programmable control means in a sequence to cause the piezoelectric driver assemblies 52 and 54, together with other appropriate piezoelectric driver assemblies, to incrementally rotate the sphere in a selected direction about any axis to position the sphere at a programmed second of arc position. This enables the mirror 44 affixed to sphere 42 to deflect the radiation beam 30 along a selected variable angle predetermined path as illustrated by laser beam 48. It is envisioned that other types of input means may be used as a programming source including, without limitation, a servo control feedback loop, a digital computer, or the like. Also, the sphere 42 and mirror 44 could be used in any optical path and be used to deflect a light beam having or forming an optical image. Also, any type of optical element, such as a prism, could be affixed to the sphere and be used to intercept the optical path.

Figure 2:
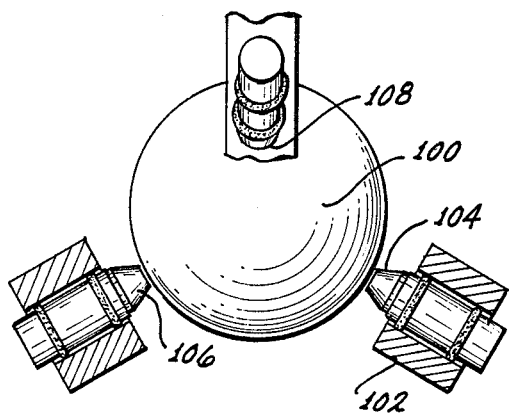
FIG. 2 is a diagrammatic representation of a sphere adapted to be rotated by a piezoelectric multiaxis micropositioner wherein the piezoelectric multiaxis micropositioner includes three piezoelectric driver assemblies for rotating the sphere about any axis passing through the center of the sphere.

FIG. 2 is a pictorial representation of a piezoelectric translation apparatus having means defining a surface, such as a sphere 100, which is adapted to be incrementally rotated in a predetermined direction. As illustrated in FIG. 2, if gravity is used to load a sphere on a three-point support system, the sphere and a mirror affixed thereto can be rotated using three piezoelectric driver assemblies. In this arrangement, the electromechanical translation apparatus is operatively connected to the sphere 100 to produce incremental rotation of the sphere 100. The electromechanical translation apparatus includes a mounting means illustrated generally by dashed lines 102, which positions the at least three piezoelectric driver assemblies illustrated as 104, 106 and 108 in a driver engagement with the sphere 100. Each of the piezoelectric driver assemblies is responsive to electrical signals being applied thereto which have a predetermined frequency and amplitude. The electrical signal varies between a first and second polarity, which cause the piezoelectric driver elements to expand and contract to change their geometrical dimensions and to incrementally step the sphere 100.

Figure 3:
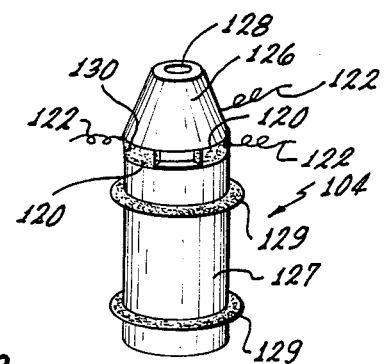
FIG. 3 is a perspective view of one of the piezoelectric driver assemblies.

FIG. 3 shows in greater detail the construction of one piezoelectric driver assembly, namely, piezoelectric driver assembly 104. The piezoelectric driver assembly 104 includes a housing 127 adapted to be positioned in the mounting means 40. Also, each piezoelectric driver assembly includes one engaging member 126, formed of a hard material such as alumina, which has a selected driving end 128 at one end thereof and a driven end 130 formed on the end opposite to the end having the selected driving end. The engaging member 126 is supported by the three piezoelectric driver elements 120 which are formed into a circular predetermined spaced, equiangular relationship on the housing 127.

Each of piezoelectric driver elements 120 is capable of responding to selectively applied electrical signals having a predetermined frequency and an amplitude which varies between a first and second polarity by expanding and contracting to change its geometrical dimensions. Means, such as conductive means 122, are operatively coupled to each of the piezoelectric driver elements 120 for selectively applying the electrical signals to each of the three piezoelectric transducers.

The three piezoelectric driver elements 120 are in contact with the driven end of the engaging member 126 and the force generated by the expansion and contraction of the three piezoelectric driver elements 120 is reacted into the engaging element, urging the selected driving end thereof into driving engagement with the sphere 100.

The piezoelectric driver assemblies 104, 106 and 108 function to incrementally rotate the sphere 100 in a predetermined direction about any selected axis relative to the geometrical center of the sphere 100. Incremental rotation is obtained when one or more of the three piezoelectric driver elements 120 of each of the piezoelectric driver assemblies 104, 106 and 108 of FIG. 2 are selectively expanded by electrical signals having an amplitude of a first polarity to urge the engaging member 126 into driving engagement with a driven member. The engaging member 126 is withdrawn from driving engagement with the sphere 100 when the piezoelectric transducers 120 contract in response to the electrical signals having an amplitude of a second polarity.

Figure 4:
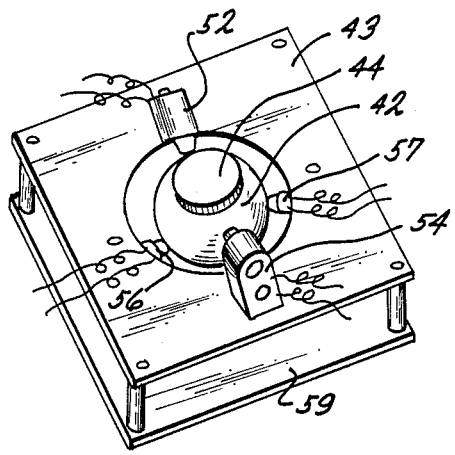
FIG. 4 is a perspective view of a spherical deflecting apparatus having a sphere and a piezoelectric translation apparatus having four piezoelectric driver assemblies.
Figure 5:
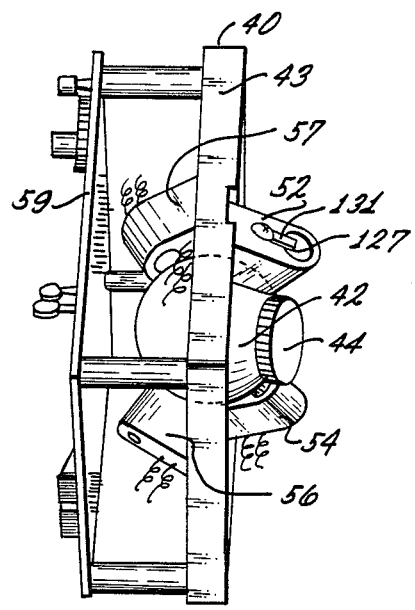
FIG. 5 is an edge view of the spherical deflecting apparatus of FIG. 4.

FIGS. 4 and 5 illustrate in greater detail the electromechanical translation apparatus 40 illustrated in FIG. 1. The electromechanical translation apparatus 40 includes a mounting means 43 having support arms 52, 54, 56 and 57 which receive and support the housings 127 which support the piezoelectric driver elements such as those illustrated as the piezoelectric driver elements in FIG. 3 and the engaging member 126.

The four piezoelectric driver assemblies of FIG. 3 are resiliently mounted in the support arms 52, 54, 56 and 57 by means of a pair of "O" rings 129 which function as an isolation means to hold the housings 127 having the piezoelectric driver elements and engaging members mounted thereon in driving relationship with the sphere 100. The housings 127 are inserted into openings in the support arms as shown in FIGS. 4 and 5 and are held by retaining springs 131 (shown in FIG. 5) to force the engaging members into driving contact with the sphere 42.

A printed circuit board 59 is operatively coupled to the rear of the housing member 43 and receives the electrical control signals and generates and applies appropriate driving voltages to the piezoelectric driver assemblies located within supports 52, 54, 56 and 57.

Typical power sources which may be used for this embodiment produce electrical signals having a frequency in the range of about 125 kilohertz with a peak amplitude of about 150 volts, peak-to-peak.

Thus the electromechanical translation apparatus is responsive to the electrical signals applied from a power source through conductors 122 to the three piezoelectric driver elements 120 of each of the piezoelectric driver elements 104, 106 and 108, to incrementally translate the sphere 100 a predetermined distance in a selected direction along a predetermined curvilinear path relative to the geometrical center of the sphere 100.

Figure 7:
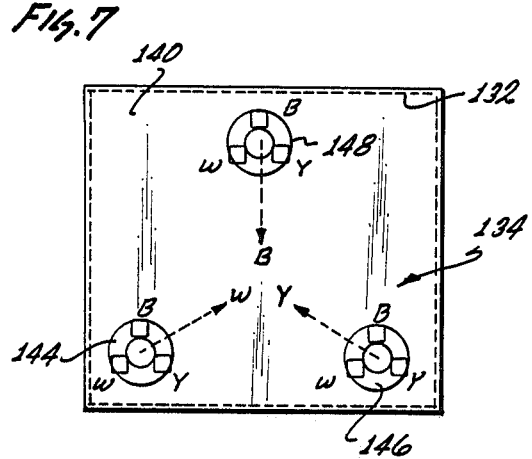
FIG. 7 is a top plan view of the piezoelectric translation apparatus of FIG. 6 with the planar member illustrated by dashed lines.
Figure 8:
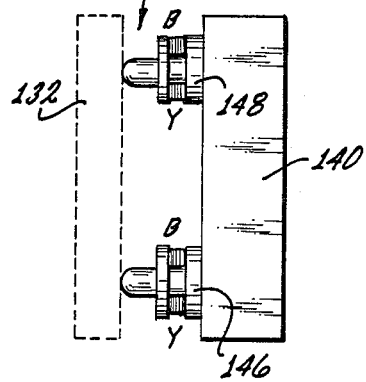
FIG. 8 is an end plan view of the piezoelectric translation apparatus and planar member illustrated in FIG. 6.
Figure 6:
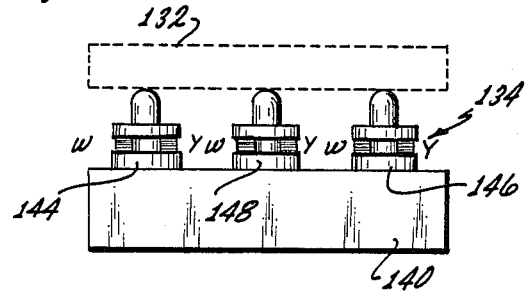
FIG. 6 is a front plan view of a piezoelectric translation apparatus which is adapted to incrementally transport and rotate a generally planar member on a selected axis.

FIGS. 6, 7 and 8 disclose an alternate embodiment of a piezoelectric translation apparatus which is adapted to incrementally move a means defining a surface in a selected direction along any axis located in the plane of the planar member or for rotating the planar member around an axis normal to the plane thereof. As illustrated in FIGS. 6, 7 and 8, the means defining a surface is a generally planar member. It may be a platen table or other device requiring X-Y displacement. The generally planar member is illustrated by dashed line 132 and may be generally in the form of a rectangle. The electromechanical translation apparatus shown generally as 134 in FIG. 6 is adapted to produce incremental movement of the means for defining a surface 132. The electromechanical translation apparatus includes a mounting means 140 which is positioned in a predetermined spaced relationship with the means defining a surface 132. The electromechanical translation apparatus 134 includes at least three piezoelectric driver assemblies 144, 146 and 148. Each of the piezoelectric driver assemblies 144, 146 and 148 is positioned in a predetermined spaced pattern relative to and in releasable engagement with the means for defining a surface 132 to define a three-point support system. Each of the piezoelectric driver assemblies is fabricated in the manner illustrated in FIGS. 9, 10 and 11.

FIG. 9 illustrates one embodiment of a piezoelectric driver assembly which is used as the piezoelectric driver assemblies 148 of FIGS. 6, 7 and 8. Piezoelectric driver assemblies 148 include a housing 150 which is formed of an electrically conductive material. The housing 150 is adapted to have its lower end 154 cooperative with the mounting means 140 (of FIG. 6) and has an upper end 152 which is adapted to support three pairs of coaxially stacked piezoelectric plates which function as piezoelectric driver elements. In FIG. 9, the piezoelectric driver elements are positioned on the housing 150 in a spaced, angular relationship to each other, as illustrated in FIG. 10. The piezoelectric driver elements are formed of two piezoelectric plates as shown in FIG. 11, such as plates 158 and 160, forming one piezoelectric driver element and plates 162 and 164 forming a second piezoelectric driver element.

The engaging member 170 has a selected driven end 172, which can terminate in the same material as the member 170, or be formed of a material having a hardness of about at least Rockwell C50, such as carbide, illustrated by cap 172. The other end of the engaging member, which forms the driving end, is generally planar is indicated by annular-shaped end 174. Annular-shaped end 174 is adapted to be in driving engagement with each of the three piezoelectric driver elements.

FIG. 10 illustrates that the three piezoelectric driver elements are arranged in a triangular pattern relative to the housing and the planar member, which planar member 174 is illustrated by the circular outline in FIG. 10. As shown in FIG. 10, each of the piezoelectric driver elements is in a spaced, equiangular relationship to the others. As illustrated in FIG. 10, the top plates 158, 162 and 180 of the three piezoelectric driver elements are positioned relative to the engaging member such that as one of the piezoelectric driver elements is selectively expanded or contracted a "rocking" effect is generated which applies a force through the engaging member selected driven end 172 to the surface of the means defining a surface so as to incrementally translate the same. The force applied by the engaging means in response to one piezoelectric driver element is along a predetermined axis causing the driven member to move in a selected direction. This will be discussed in greater detail with respect to FIG. 19.

The wiring and arrangement of each piezoelectric driver element is illustrated in FIG. 11. FIG. 11 illustrates one of the three piezoelectric driver elements. A top piezoelectric plate 158 is mounted with one polarity surface positioned toward the bottom, which surface is generally indicated by the "plus" signs. The lower piezoelectric plate 160 is likewise assembled with the same polarity surface adjacent to the other surface of plate 158 to produce the piezoelectric driver elements. An electrical conductor 170 is operatively connected to the common faces of the piezoelectric plates 158 and 160, and the planar member 174 and housing 150 are electrically connected, using well-known techniques, to electrically connect the plates 158 and 160 in parallel such that each of the piezoelectric plates 158 and 160 is concurrently expanded or contracted in response to an electrical signal. The expansion and contraction are additive such that the total movement of the engaging member 170 is greater than the displacement of a single plate and is equal to the displacement of both plates. This arrangement is known as the "center tap" connection.

FIG. 12 illustrates an alternative embodiment of a piezoelectric translation apparatus utilizing a different method of mounting the piezoelectric driver assemblies in a predetermined location for incrementally rotating a sphere. In FIG. 12, the piezoelectric translation apparatus includes a sphere 200 which is adapted to be incrementally rotated in a predetermined direction about any axis relative to the geometrical center of the sphere 200. The angle and magnitude of the force vectors supplied thereto by the piezoelectric driver assemblies can be selectively varied to choose the desired axis of rotation. The electromechanical translation apparatus includes a mounting means shown generally as 202 which has a first support arm 204 and a second support arm 206. Each of the first support arm 204 and the second support arm 206 is arcuate shaped and has operatively connected near each end thereof a piezoelectric driver assembly. In this embodiment, arm 204 represents a north-south axis, while arm 206 represents an east-west axis. For example, first support arm 204 has piezoelectric driver assemblies 210 and 212 operatively attached near the ends thereof. Each of the piezoelectric driver assemblies is constructed in the manner as illustrated in connection with FIGS. 10, 11 and 14. The support arms 204 and 206 and four piezoelectric driver assemblies function to provide the four contact points required to support the sphere. The shape of the first support arm 204 is such that the engaging members of the piezoelectric driver assemblies 210 and 212 are urged into releasable engagement with the surface of sphere 200. The arcuate shape of first support arm 204 ensures positive engagement between the sphere 200 and the engaging members of each of the piezoelectric driver assemblies 210 and 212. The first support arm 204 is positioned relative to one axis of the sphere which passes through the geometrical center 218 of the sphere 200.

The second support arm 206 is similar in construction and is positioned around a second axis which is perpendicular to the first axis passing through the center 218.

FIG. 13(a) illustrates the construction of the arcuate shaped first support arm 204 having the piezoelectric driver assemblies 210 and 212 operatively connected near the end thereof. The engaging members of the piezoelectric driver assemblies 210 and 212 have been removed to show the three piezoelectric driver elements which are generally indicated as 230.

In a similar manner, FIG. 13(b) illustrates the form of the second support arm 206 and the piezoelectric driver assemblies 220 and 222 located near the ends thereof. The piezoelectric driver assemblies 220 and 222 are shown with the engaging members thereof removed to expose the three piezoelectric driver elements and to show that the same are arranged in a pattern on the housing.

Figure 14:
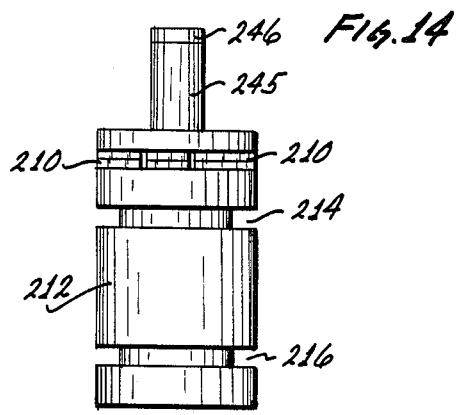
FIG. 14 is a pictorial representation of a piezoelectric driver assembly adapted to be utilized in connection with the first and second support arms of FIGS. 13(a) and 13(b)

FIG. 14 illustrates an alternate embodiment of a piezoelectric driver assembly using three piezoelectric driver elements, for example, piezoelectric driver elements 210, which are arranged in a circular pattern on the end of housing 212. Housing 212 has annular grooves formed near each end thereof, such as grooves 214 and 216. The annular grooves 214 and 216 are adapted to receive "O" rings similar to "O" rings 129 shown in FIG. 3. The engaging member 245 is in the form of a deflectable beam having a piece of hard material 246 affixed to the end thereof to form the assembled engaging member. The selected driven end 246 is flat, as illustrated in FIG. 14.

Figure 15:
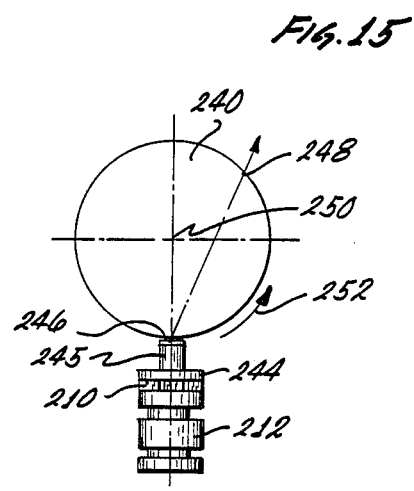
FIG. 15 is a pictorial representation of how rotation of a sphere occurs in response to the force applied by the selected piezoelectric driver assembly.

FIG. 15 illustrates diagrammatically how the incremental rotation of a sphere 240 is obtained by means of a piezoelectric driver assembly such as shown in FIG. 14. The piezoelectric translation apparatus has a mounting means which supports housing 212. Three piezoelectric driver elements 210 are positioned between the housing 212 and the engaging member 245 having a planar surface 244 in contact with the piezoelectric driver elements 210 and a selected driven end 246 in contact with the sphere 240.

The piezoelectric driver element 210 expands in response to an applied electrical input at a predetermined frequency and amplitude and, when the amplitude is of a first polarity, a force is developed between the housing 242 and the sphere 240 via the engaging member 245 and the selected driven end 246. The force vector is illustrated by arrow 248 which is off the center 250 of the sphere 240. The displacement of the force vector 248 from the center 250 generates a torque due to the friction between the selected driven end 246 of the engaging member 245 and the surface of the sphere 240, causing a rotation in a counterclockwise direction illustrated by arrow 252.

Figure 16:
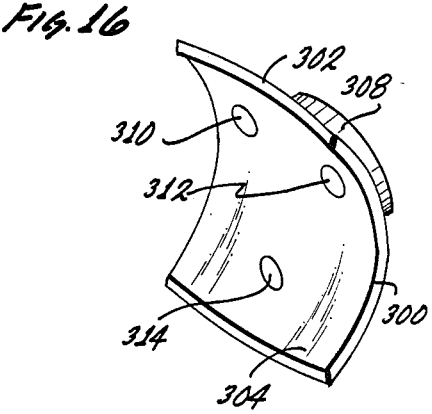
FIG. 16 is a pictorial representation of a spherical segment having a mirror attached thereto and which is adapted to be rotated by three piezoelectric driver assemblies located on the inner surface thereof.

FIG. 16 illustrates another embodiment of a piezoelectric translation apparatus which is capable of incrementally moving a spherical segment, such as a thin-walled spherical segment 300 having a mirror 308 affixed thereto. The thin-walled spherical segment 300 has a polished surface 304 on the concave side thereof and has an outer wall 304. Three piezoelectric driver assemblies are illustrated as 310, 312 and 314 in FIG. 16. The three piezoelectric driver assemblies 310, 312 and 314 are positioned in a predetermined spaced pattern relative to and in releasable engagement with the concave surface of the spherical segment 300 to define a three-point support system.

Figure 17:
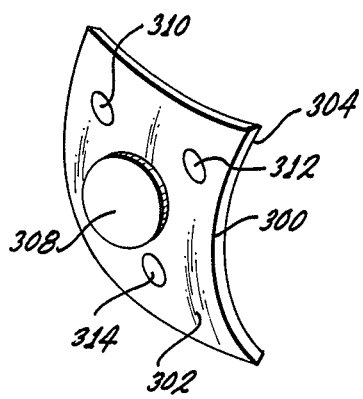
FIG. 17 is a pictorial representation of a spherical segment having a mirror affixed thereto wherein the piezoelectric driver assemblies are adapted to incrementally translate the same by drivingly engaging the polished surface thereof.

FIG. 17 illustrates the spherical segment 300 having the mirror 308 affixed thereto in an arrangement whereby the piezoelectric driver assemblies 310, 312 and 314 are adapted to drivably engage the spherical segment on its polished convex surface 302.

Figure 18:
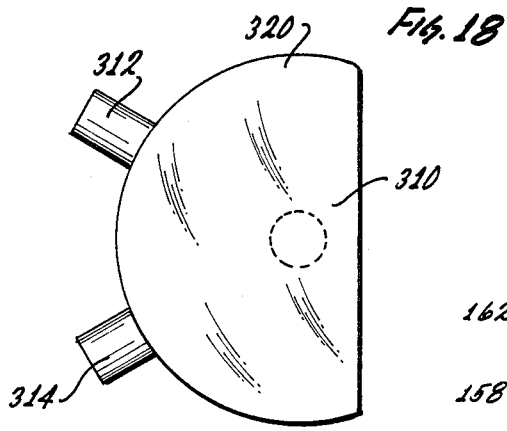
FIG. 18 is a pictorial representation of a segment in the form of a hemisphere having a mirror attached thereto.

FIG. 18 illustrates an alternate embodiment of the spherical member in the form of a hemisphere 320 having an optical element, such as a planar deflecting member (not shown) affixed thereto and movable therewith. The three piezoelectric driver assemblies 310, 312 and 314 are positioned in operative engagement with the outer surface of the hemisphere to provide a three-point support system and to rotate the same in incremental steps about any axis extending through the geometrical center of the hemisphere 320.

Although the examples of a sphere, spherical segment, and hemisphere are preferred embodiments for practicing the invention, it is envisioned that the means defining a driven member could be a zone of a sphere capable of being driven on an external or internal surface by at least three piezoelectric driver assemblies described herein.

Figure 19:
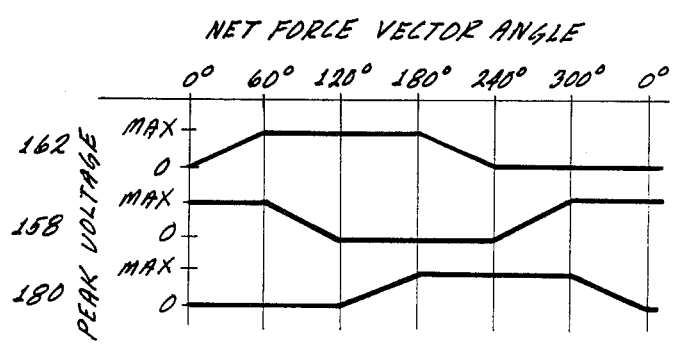
FIG. 19 is a graph showing the net force vector angle of a piezoelectric driver assembly with three piezoelectric driver elements plotted as a function of peak voltage for the three piezoelectric driver elements to produce a force vector of a selected angle.

FIG. 19 is a graph illustrating the peak voltages required to be applied to the three piezoelectric driver elements of a piezoelectric driver assembly to produce a force vector at a selected angle to obtain the selected direction of translation of a driven member. FIG. 10 shows the physical arrangement of the three piezoelectric driver elements relative to an engaging member wherein the top piezoelectric plates 158, 162 and 180 are shown. Reference dashed lines are drawn at angles 0°, 120° and 240° as shown in FIG. 10. FIG. 19 uses the piezoelectric driver element top plate as the means for identifying the appropriate driver element in FIG. 10. The graph illustrates that by controlling the peak voltage of the electrical signal and by selectively applying the voltage at either a zero amplitude, a maximum amplitude or a selected intermediate amplitude, the net force vector angle of the force applied to the driven member can be specifically programmed. For example, to develop a force vector at the zero degree dashed line in FIG. 10, a 0 voltage is applied to piezoelectric driver elements identified as 162 and 180 while the maximum peak voltage is applied to piezoelectric driver element identified as 158. In essence, the force vector angle can be produced at any desired angle and, consequently, the contact point of the engaging member on the driven member can be translated along any axis.

A control electrical system may use a constant voltage and limit the motion to the six directions that can be produced by on-off control of the three piezoelectric driver elements. With such an on-off control means, any desired vector angle can be closely approximated by applying the voltage in pulses of the proper duration to selected piezoelectric driver elements.

When motion along orthogonal (X,Y) axes is desired, it may simplify the control system to use a piezoelectric driver assembly with four piezoelectric driver elements equally spaced, whereby motion in a selected direction would be produced by energizing two adjacent piezoelectric driver elements.

FIG. 20 illustrates an alternative embodiment of a piezoelectric translation apparatus utilizing the piezoelectric driver assemblies of FIG. 9 in place of the piezoelectric driver assemblies illustrated in FIG. 12. In FIG. 20, the piezoelectric translation apparatus includes a sphere 400 which is adapted to be incrementally rotated in a predetermined direction about any axis relative to the geometrical center of the sphere 400. The electromechanical translation apparatus includes a mounting means, shown generally as 402, which has a first support arm 404 and a second support arm 406. Each of the first support arm 404 and the second support arm 406 is arcuate shaped and has operatively connected near each end thereof a piezoelectric driver assembly. In this embodiment, arm 404 represents a north-south axis, while arm 406 represents an east-west axis. For example, first support arm 404 has piezoelectric driver assemblies 410 and 412 operatively attached near the ends thereof. Each of the piezoelectric driver assemblies is constructed in the manner as illustrated in connection with FIG. 9. The support arms 404 and 406 and four piezoelectric driver assemblies function to provide the four contact points required to support the sphere. The mounting means 402 is adapted to include a compliance means (not visible) which acts through the support arms 404 and 406 to force the engaging members of the piezoelectric driver assemblies 410 and 412 into releasable engagement with the surface of sphere 400. The first support arm 404 establishes the alignment between the sphere 400 and the engaging members of each of the piezoelectric driver assemblies 410 and 412. The structure of the first support arm 406 and the second support arm 406 is similar to that of FIG. 12 discussed hereinbefore.

FIGS. 6, 7, 8, 16, 17 and 18 illustrate piezoelectric translation apparatus having only three piezoelectric driver assemblies. The piezoelectric translation apparatus of FIGS. 6, 7, 8, 16, 17 and 18 require the use of gravity or some other suitable loading member to maintain the driven member in contact with the piezoelectric driver assemblies. In certain applications, it is desirable that the driven member be held in such a manner that the piezoelectric translation apparatus can be operated in any position without relying on gravity to maintain contact between the piezoelectric driver assemblies and the driven member at the driver points.

The embodiments of FIGS. 21 and 22 provide such loading members which include one or more piezoelectric driver assemblies which generate additional driving forces, and include a compliance means for providing loading forces to maintain contact at the driver points.

Figure 25:
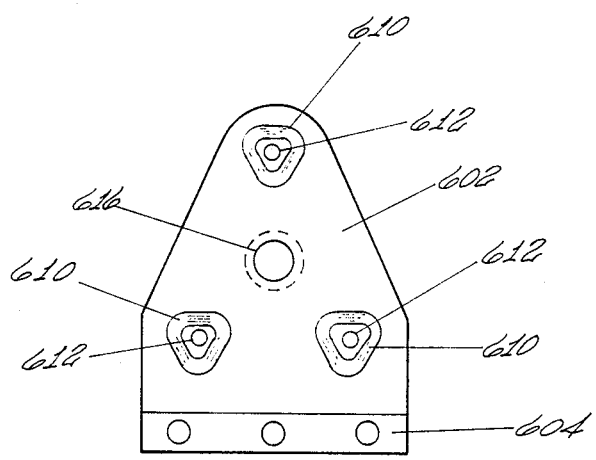
FIG. 25 is a top plan view of one of the driver plates of FIG. 24 showing the location of three integral piezoelectric driver assemblies mounted thereon.

FIG. 21 shows a piezoelectric translation apparatus as a planar, micropositioner 520 in which two of the six piezoelectric driver assemblies 522 and 524 are shown. The piezoelectric driver assemblies are distributed generally in a triangular pattern as illustrated in FIG. 25 herein below. Piezoelectric driver assembly 522 is mounted in the loading plate 526 and the includes a housing section 530, as a separate element, piezoelectric elements 532 and an engaging member 534. The engaging member 534 engages and drives the driven member 540 to produce linear planar movement associated with such piezoelectric driver assemblies. The fixed plate 544 likewise supports an identical piezoelectric driver assembly 524.

As is depicted in FIG. 21, the engaging members of piezoelectric driver assemblies 522 and 524 engage opposite surfaces of the driven member 540, which in this embodiment is illustrated as a flat plate. A compliance means, such as coil springs 518, couple the loading plate 526 and the fixed plate 544 to maintain loading of the engaging members of each of the piezoelectric driver assemblies against against the central driven member 540. The driven member 540 could be a spherical section, such as for example, a spherical section as shown in FIG. 16.

Each of the piezoelectric driver assemblies, for example 522, has three piezoelectric driving elements positioned between the housing section 530 and the driven end of the engaging member 532. The piezoelectric driving elements are positioned in a predetermined spaced, angular relationship to each other. The piezoelectric driving elements are capable of responding to an applied electrical signal having a predetermined frequency and an amplitude which varies between a first polarity and second polarity to expand and contract to change its geometrical dimensions. The piezoelectric driving elements are responsive to an electrical signal having an amplitude of a first polarity to urge the engaging member into driving engagement with the driven member 524 to apply a driving force thereto in a selected direction. In a similar manner, the piezoelectric driving elements are responsive to an electrical signal having an amplitude of a second polarity to withdraw the engaging member from driving engagement the driven member 540.

FIG. 22 illustrates a piezoelectric translation apparatus that likewise uses piezoelectric driver assemblies positioned on each side of the driven member to obtain planar, linear movement wherein coil springs are used to maintain the piezoelectric driver assemblies in contact with a central member. In FIG. 22, the housing sections of the piezoelectric driver assemblies, shown as 550 and 552, are integral with their associated loading plate 556 and fixed plate 558, respectively. Piezoelectric driver assembly 550 is integral with and uses a section of the loading plate 556 as its housing section. The loading plate 556 supports the piezoelectric elements 560 which are operatively coupled to the engaging member 562. A compliance means, such as coil springs 554, couples the loading plate 556 and the fixed plate 558 to maintain loading of the engaging elements of each of the piezoelectric driver assemblies against the central driven member 566.

The structure of piezoelectric driver assembly 552 is the same as that of piezoelectric driver assembly 550. The engaging member 562 of piezoelectric driver assembly 562 and the engaging member of piezoelectric driver assembly 552 are located on and contact the opposite surfaces of the driven member 566 to engage and drive the same.

In both FIGS. 21 and 22, in the preferred embodiment, the loading and fixed plates are fabricated from a conductive metal material which enables the plates to serve as a common electrical connection. In the alternative, the loading and fixed plates can be fabricated from a dielectric material such as a ceramic, and in such apparatus, additional wiring may be required in lieu of using the plates as a common electrical connection. The engaging members can be fabricated from hard metal, or from a ceramic material. The piezoelectric elements are electrically connected as illustrated in FIG. 3, 9 or 11, as appropriate for the materials used, and the exact electrical connections required therefor will be apparent to a person skilled in the art.

The piezoelectric driver assemblies illustrated in FIGS. 21 and 22 can be utilized in the multiaxis positioner illustrated in FIGS. 2, 12 and 20.

FIG. 23 illustrates another embodiment of a piezoelectric translation apparatus 570 having a fixed plate 572 and a loading plate 582. The fixed plate 572 and loading plate 582 contain the piezoelectric driver assemblies which are adapted to rotate a disc corresponding to driven member 566 of FIG. 22 which carries the center hub 578. The loading plate 582 is operatively coupled to the fixed plate 572 through compliance means in the form of leaf spring members 574 which resiliently load the piezoelectric driver assemblies against driven disc which carries the center hub 578. The center hub 578 is adapted to receive and support a load which is to be translated and/or rotated in the plane of an adjacent protective annular ring 580. The control electronics 584 are mounted below the fixed plate 572.

Figure 24:
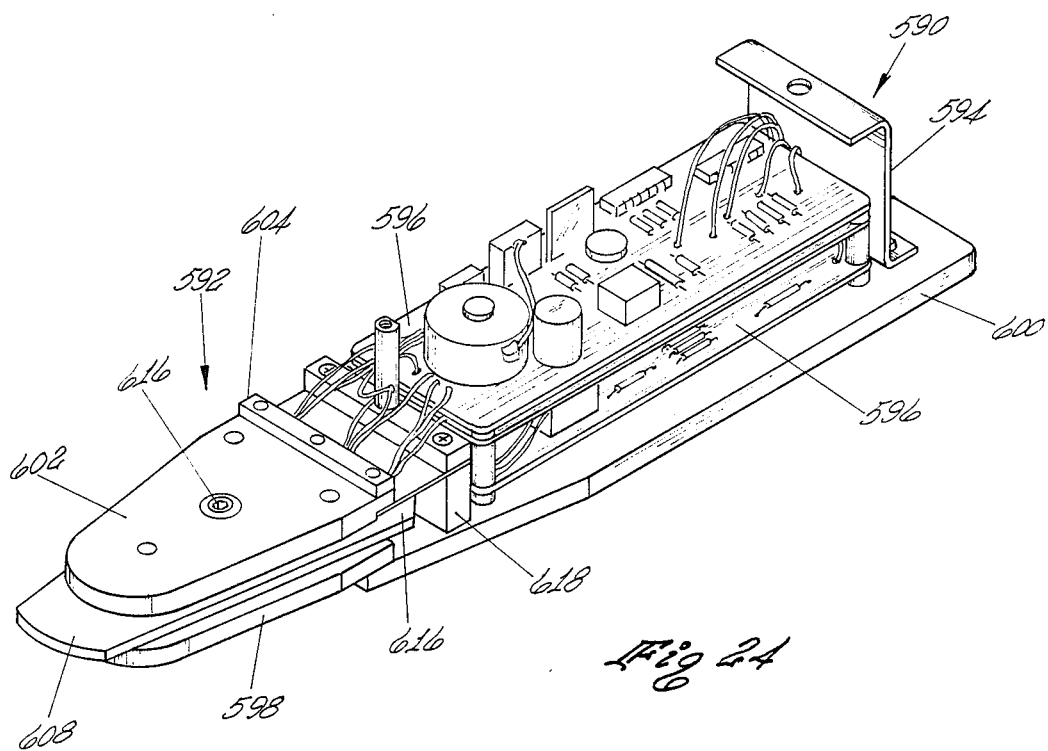
FIG. 24 is another embodiment of an electromechanical micropositioner having a piezoelectric translation apparatus located adjacent an electric control system and wherein the piezoelectric translation apparatus has a pair of spaced driver plates each of which has three integral piezoelectric driver assemblies which contact the opposed surfaces of a central driven member to produce relative motion therebetween such that piezoelectric translation apparatus can be operated in any position without relying on gravity to maintain contacts at the driver points.

Under certain operating conditions, it may not be practical to use a passive loading member, such as a spring, against the driven member to maintain driver contact because of the frictional load involved. FIG. 24 illustrates a piezoelectric translation apparatus that likewises uses piezoelectric driver assemblies positioned on each side of the driven member to obtain planar, linear and/or rotational movement.

In FIG. 24, the piezoelectric micropositioner is shown generally as 590. The piezoelectric micropositioner 590 includes an electronic control system 594 and a piezoelectric translation assembly shown generally as 592. The piezoelectric translation assembly 592 comprises a fixed plate 592 and a loading plate assembly 602 which are positioned on opposite sides of a center driven member 608. In this embodiment, the center driven member 608 is in the form of a planar member. The driver plate assemblies 598 and 602 each include three piezoelectric driver assemblies, one of which for plate 602 is shown in greater detail in FIG. 25, to provide six piezoelectric driver assemblies for producing the controlled planar movement. Each of the piezoelectric driver assemblies include three piezoelectric driving elements as described in connection with FIG. 21 above.

The electronic control system 594 includes printed circuit boards 596 which contain the electrical components for the electronic control circuitry and the boards 596 are mounted onto a base support 600. A compliance means, in the form of a spring, is passed through an opening 616 in the loading plate 602 and extends to the fixed plate 598 to provide the loading between the driver plate assemblies 598 and 602.

In FIG. 25, the side of the loading plate assembly 602, that is adapted to be positioned adjacent the center driven member 608 of FIG. 24, is shown. The piezoelectric driver assemblies 610 are integral with the driver plate using the structure illustrated in FIG. 22. The piezoelectric driver assemblies 610 are arranged in a triangular pattern, and the engaging elements 612 of each of the piezoelectric driver assemblies 610 are adapted to engage the surface of the center driven member 608 of FIG. 24.

The loading plate assembly 602 is held in position opposite to the fixed plate assembly 598 by means of flexible strip 616, which is attached to end 604 and support bracket 618. The loading force on the driven member 608 is provided by a compliance means, which in this embodiment, is a coil spring positioned in the center hole 616 and passing through a corresponding hole in the driven member 608 to a fixed end in the fixed plate assembly 598. In some cases it may be practical to provide the loading force by means of the flexure strip 616, which would function as the compliance means.

The embodiments illustrated in FIGS. 22, 23 and 24 permit the piezoelectric traslation apparatus to be operated in any position without relying on gravity to maintain the engaging elements of each of the piezoelectric driver assemblies in contact with the surface of the driven member. In this manner, the driving forces developed by the piezoelectric driver assemblies will be maintained in any operating of the apparatus.

One of the preferred embodiments of the piezoelectric translation apparatus using the teachings of the present invention is described as part of an optical system in which it is used to aim a laser beam. In addition, the concept of a piezoelectric translation apparatus can be utilized in a number of applications other than for optical beam deflection purposes. For example, the rotatable element can be some type of switching system, a platen of a device requiring precision adjustment, a digital encoder, or other precision instrumentation device or apparatus which requires a precise, programmable incremental movement along one of any number of axes of a member which has a means for defining a surface such as a plane, cylinder or sphere, or section thereof, which is capable of being translated on a desired axis.

What is claimed is:

1. An electromechanical translation apparatus comprising
    means defining a driven member which is adapted to be incrementally moved in a selected direction;
    a piezoelectric multiaxis micropositioner adapted to produce incremental movement of said means for defining a driven member in said selected direction, said piezoelectric multiaxis micropositioner including
        a mounting means positioned in a spaced relationship from said means defining a driven member;
        at least one piezoelectric driver assembly positioned in the space between the mounting means and means defining the driven member and having
            a housing operatively coupled to said mounting means;
            an engaging member formed of a hard material and having a selected driving end at one end thereof and a driven end formed on the end opposite to said one end having said selected driving end, said one end of the engaging member being capable of selectively engaging and translating said means defining the driven member in response to a driving force applied to said one end;
            at least three piezoelectric driving elements positioned between said housing and said driven end of said engaging member and positioned in a predetermined spaced, angular relationship to each other, said piezoelectric driving elements being capable of responding to an applied electrical signal having a predetermined frequency and an amplitude which varies between a first polarity and second polarity to expand and contract to change its geometrical dimensions, said piezoelectric driving element being responsive to an electrical signal having an amplitude of a first polarity to urge the engaging member into driving engagement with said means defining said driven member to apply a driving force thereto in a selected direction and being responsive to an electrical signal having an amplitude of a second polarity to withdraw the engaging member from driving engagement with said means defining said driven member; and
        means operatively coupled to each of said three piezoelectric driving elements for selectively applying a said electrical signal to each of said three piezoelectric driving elements for expanding and contracting one or more of said piezoelectric driving elements at the same time;
    said electromechanical translation apparatus being responsive to said electrical signals being selectively applied to one or more of said at least three piezoelectric driving elements to urge said at least one engaging member into engagement with said means defining a driven member to apply a driving force thereon to incrementally translate said means defining said driven member in a selected direction along one of two or more predetermined axes.

2. The piezoelectric translation apparatus of claim 1 wherein said means defining a driven member defines a spherical segment having a surface which is equally distant from a geometrical center at all points.

3. The piezoelectric translation apparatus of claim 2 wherein said spherical segment includes an optical element affixed thereto and movable therewith.

4. The piezoelectric translation apparatus of claim 2 wherein said piezoelectric driving elements are capable of responding to an electrical signal to produce incremental movement of said spherical segment along any axis which passes through the center of the spherical segment.

5. The piezoelectric translation apparatus of claim 1 wherein said means defining a driven member defines a generally planar surface which is adapted to be incrementally moved in any selected direction.

6. The piezoelectric translation apparatus of claim 5 wherein said selected direction is along any selected line in the plane of the planar surface.

7. The piezoelectric translation apparatus of claim 5 wherein said selected direction is an angular rotation about any selected axis normal to the plane of the planar surface.

8. A piezoelectric translation apparatus comprising
    means defining a part of a sphere having a surface which is equally distant from a geometrical center at all points and which is adapted to be incrementally moved in a selected direction relative to said geometrical center;

an electromechanical translation apparatus adapted to produce incremental movement of said means for defining a part of a sphere having a mounting means positioned in a predetermined spaced relationship from said means defining a part of a sphere;

at least three housings operatively coupled to said mounting means;

at least three engaging members each being formed of a hard material and having a selected driving end at one end thereof and a driven end formed on a surface opposite to said one end having said selected driving end, said engaging members being positioned in the predetermined space between said mounting means and said means defining said part of a sphere and adapted to have the one end thereof having the selected driving end urged into driving engagement with said means defining said part of a sphere;

at least three sets of three piezoelectric driving elements positioned with one set thereof between one of said at least three housings and one of said at least three engaging members with said one set of three piezoelectric driving elements positioned in engagement with the driven end of one of the engaging members and in a predetermined spaced, angular relationship to each other, each of said piezoelectric driving elements being capable of responding to an applied electrical signal having a predetermined frequency and an amplitude which varies between a first polarity and second polarity to expand and contract to change its geometrical dimensions, said piezoelectric driving elements being responsive to an electrical signal having an amplitude of a first polarity to urge its associated engaging member into driving engagement with said means defining said driven member to apply a driving force thereto in a selected direction and being responsive to an electrical signal having an amplitude of a second polarity to withdraw the at least one engaging member from driving engagement with said means defining said driven member; and means operatively coupled to each of said three piezoelectric driving elements for selectively applying a said electrical signal to each of said three piezoelectric driving elements for expanding and contracting one or more piezoelectric driving elements at the same time;

said electromechanical translation apparatus being responsive to said electrical signals being selectively applied to one or more of said three piezoelectric driving elements of each of the three sets thereof to urge said engaging members into engagement with said means defining said part of a sphere to apply a driving force thereon to incrementally translate said means defining said part of a sphere in a selected direction along one of two or more predetermined axes.

9. The piezoelectric translation apparatus of claim 8 wherein said means defining a part of a sphere has an optical element affixed thereto and movable therewith.

10. The piezoelectric translation apparatus of claim 8 wherein said means defining a part of a sphere defines a ball which has a planar mirror affixed thereto and movable therewith.

11. The piezoelectric translation apparatus of claim 8 wherein said means defining the part of a sphere defines a thin-walled part of a sphere having a smooth outer convex surface and an inner surface.

12. The piezoelectric translation apparatus of claim 11 wherein said at least three engaging members are positioned to releasably engage the smooth outer convex surface of the part of a sphere to provide incremental movement thereof about any axis relative to the geometrical center of the part of a sphere to controllably change the position of the optical element affixed to said part of a sphere.

13. The piezoelectric translation apparatus of claim 8 wherein said means defining the part of a sphere defines a thin-walled part of a sphere having an outer convex surface and a smooth inner surface.

14. The piezoelectric translation apparatus of claim 13 wherein said at least three piezoelectric driving elements are positioned to releasably engage the inner surface of the part of a sphere to provide incremental movement about any axis relative to the geometrical center of the part of a sphere to controllably change the position of the optical element affixed to said part of a sphere.

15. The piezoelectric translation apparatus of claim 10 further comprising a power source for producing an electrical signal having a frequency of about 125 kilohertz and wherein the amplitude thereof is approximately 150 volts peak to peak.

16. An adjustable, multiposition spherical deflection apparatus comprising a sphere having a polished outer surface and a planar mirror affixed to the outer surface thereof to define an optical reflecting surface;

a mounting means positioned in a predetermined spaced relationship from said sphere;

at least three piezoelectric driver assemblies positioned in the space between said sphere and mounting means, said three piezoelectric driver assemblies being arranged into a circular, predetermined, spaced, angular relationship relative to said sphere, each of said piezoelectric driver assemblies including a housing operatively coupled to said mounting means;

an engaging member formed of a hard material and having a selected driving end at one end thereof and a driven end formed on the end opposite to said one end having said selected driving end, said engaging member being positioned with the one end of the selected driving end being urged into driving engagement with said sphere to apply one or more driving forces thereto to incrementally translate the same in a selected direction along any one of two or more axes;

at least three piezoelectric driving elements being positioned between the housing and engaging member wherein the driven end of said engaging member is in contact with the three piezoelectric driving elements, each of the three piezoelectric driving elements being positioned in a predetermined angular relationship to the others, each of the piezoelectric driving elements being capable of responding to an electrical signal being applied thereto having a predetermined frequency and an amplitude which varies between a first polarity and second polarity to expand and contract to change its geometrical dimensions, said piezoelectric driving elements being responsive to an electrical signal having an amplitude of a first polarity to urge the selected driving end the engaging member into driving engagement with said sphere to apply a driving force thereto in a selected direction and being responsive to an electrical signal having an amplitude of a second polarity to withdraw the at least one engaging member from driving engagement with said means defining said driven member;

means operatively coupled to each of said three piezoelectric driving elements for selectively applying a said electrical signal to each of said three piezoelectric driving elements for expanding and contracting one or more piezoelectric driving elements at the same time to apply a driving force to the driven end of said engaging member;

said spherical deflection apparatus being responsive to said electrical signals being selectively applied to one or more of said three piezoelectric driving elements to develop a rotational force on said sphere to incrementally rotate said sphere in a selected direction about any one of two or more predetermined axes.

17. A precision deflecting system adapted to deflect a laser beam in incremental steps wherein each step is a fraction of a minute of arc, said system comprising a source of coherent radiation having a predetermined frequency for directing a coherent radiation beam along a first predetermined path;

an adjustable spherical deflecting apparatus located along said first predetermined path for intercepting said radiation beam and for selectively deflecting the same along a variable angle second predetermined path, said adjustable spherical deflecting apparatus having a sphere having a polished outer surface and a planar deflection member affixed to the outer surface thereof to define an optical reflecting surface;

a mounting means positioned in a predetermined spaced relationship from said sphere;

at least three piezoelectric driver assemblies positioned in the space between said sphere and mounting means, said three piezoelectric driver assemblies being arranged into a circular, predetermined, spaced, equiangular relationship relative to said sphere, each of said piezoelectric driver assemblies including a housing operatively coupled to said mounting means;

an engaging member formed of a hard material and having a selected driving end at one end thereof and a driven end formed on the end opposite to said one end having said selected driving end, said engaging member being positioned with said selected driving end being urged into driving engagement with said sphere to apply one or more driving forces thereto to incrementally translate the same in a selected direction along any one of three axes;

at least three piezoelectric driving elements being positioned between the housing and engaging member wherein the driven end of said engaging element is in contact with the three piezoelectric driving elements, each of the three piezoelectric driving elements being positioned in a predetermined angular relationship to each other, each of piezoelectric driving elements being capable of responding to an electrical signal being applied thereto having a predetermined frequency and an amplitude which varies between a first polarity and second polarity to expand and contract to change its geometrical dimensions, said piezoelectric driving elements being responsive to an electrical signal having an amplitude of a first polarity to urge their associated engaging members into driving engagement with said sphere to apply a driving force thereto in a selected direction and being responsive to an electrical signal having an amplitude of a second polarity to withdraw the at least one engaging member from driving engagement with said means defining said driven member;

means operatively coupled to each of said three piezoelectric driving elements for selectively applying a said electrical signal to each of said three piezoelectric driving elements for expanding and contracting one or more piezoelectric driving elements at the same time;

said precision deflecting system being responsive to said electrical signals being selectively applied to one or more of said three piezoelectric driving elements to develop a rotational force on said sphere to incrementally rotate said sphere in a selected direction about any one of two or more predetermined axes;

programmable control means including a power supply for generating said electrical signals and for selectively applying the same to said three sets of three piezoelectric driving elements, said programmable control means including input means for programming said programmable control means to selectively apply said electrical signals to each of said piezoelectric driving elements in each of said three sets of three piezoelectric driver assemblies in a programmed sequence to cause said piezoelectric driving elements to incrementally rotate said sphere in a selected direction about any one of two or more predetermined axes to position said sphere at a programmed fraction of a minute of arc enabling the planar deflection member affixed to said sphere to deflect said radiation beam along a selected variable angle second predetermined path.

18. The precision deflecting system of claim 17 further comprising means defining a folded optical path positioned along said predetermined path to intercept and deflect said radiation beam along said folded optical path.

19. An electromechanical translation apparatus comprising means defining a surface and which is adapted to be incrementally moved in a selected direction;

a piezoelectric translation apparatus adapted to produce incremental movement of said means for defining a surface in said selected direction, said piezoelectric translation apparatus having at least one piezoelectric driver assembly wherein said at least one piezoelectric driver assembly includes a housing positioned in operative relationship to and spaced from said means defining a surface;

an engaging member which is formed of a hard material and which has a selected driving end at one end thereof and a driven end formed at the other end thereof, said engaging member being positioned between said means defining a surface and housing and with the selected driving end thereof adapted to drivingly engage said means defining a surface;

three piezoelectric driving elements positioned in a driving engagement with the driven end of the engaging member, each of said piezoelectric driving elements being capable of responding to an applied electrical signal having a predetermined frequency and an amplitude which varies between a first polarity and second polarity to expand and contract to change its geometrical dimensions, said piezoelectric driving elements being responsive to an electrical signal having an amplitude of a first polarity to urge the at least one engaging member into driving engagement with said means defining said driven member to apply a driving force thereto in a selected direction and being responsive to an electrical signal having an amplitude of a second polarity to withdraw the at least one engaging member from driving engagement with said means defining said driven member; and means operatively coupled to each of said three piezoelectric driving elements for selectively applying a said electrical signal to each of said three driving elements for expanding and contracting one or more piezoelectric driving elements at the same time;

said electromechanical translation apparatus being responsive to said electrical signals being selectively applied to one or more of said three piezoelectric driving elements to develop a driving force on said means defining a surface in a selected direction to incrementally translate said means defining said surface in a selected direction along one of two or more predetermined axes.

20. The piezoelectric translation apparatus of claim 19 wherein said means defining a surface is a sphere having a optical element affixed thereto.

21. The electromechanical translation apparatus of claim 16 wherein said piezoelectric translation apparatus includes a mounting means having first and second support arms each of which has one piezoelectric driver assembly located near the end thereof, said first and second support arms being operatively positioned relative to said sphere such that said first and second loading arms positions the sphere in a desired location while urging the selected driving end of the engaging member of the electromechanical translation apparatus located at each end thereof into driving engagement with the outer surface of said sphere to rotate the sphere about any axis.

22. A piezoelectric multiaxis micropositioner adapted to produce incremental movement of a means for defining a driven member in said selected direction, said piezoelectric multiaxis micropositioner including a mounting means positioned in a spaced relationship from a means defining a driven member;

at least one piezoelectric driver assembly positioned in the space between the mounting means and a means defining the driven member and having a housing operatively coupled to said mounting means;

an engaging member formed of a hard material and having a selected driving end at one end thereof and a driven end formed on the end opposite to said one end having said selected driving end, said one end of the engaging member being capable of selectively engaging and translating a means defining the driven member in response to a driving force applied to said one end; and at least three piezoelectric driving elements positioned between said housing and said driven end of said engaging member and positioned in a predetermined spaced, angular relationship to each other, said piezoelectric driving elements being capable of responding to an applied electrical signal having a predetermined frequency and an amplitude which varies between a first polarity and second polarity to expand and contract to change its geometrical dimensions, said piezoelectric driving element being responsive to an electrical signal having an amplitude of a first polarity to urge the engaging member into driving engagement with said means defining said driven member to apply a driving force thereto in a selected direction and being responsive to an electrical signal having an amplitude of a second polarity to withdraw the engaging member from driving engagement with said means defining said driven member.

23. A method for producing incremental movement of a means defining a driven member comprising the step of applying an electrical signal having a predetermined frequency and an amplitude which varies between a first polarity and a second polarity to a piezoelectric multiaxis positioner having a mounting means and at least one piezoelectric driver assembly having a housing, an engaging member and at least three piezoelectric driving elements wherein the piezoelectric driving elements respond to the electrical signal having a first polarity and second polarity to expand and contract to change its geometrical dimensions, said piezoelectric driving element being responsive to an electrical signal having an amplitude of a first polarity to urge the engaging member into driving engagement with said means defining said driven member to apply a driving force thereto in a selected direction and being responsive to an electrical signal having an amplitude of a second polarity to withdraw the engaging member from driving engagement with said means defining said driven member.

24. An electromechanical translation apparatus comprising means defining a driven member which is adapted to be incrementally moved in a selected direction;

a piezoelectric micropositioner adapted to produce incremental movement of said means for defining a driven member in said selected direction, said piezoelectric micropositioner including a first and second mounting means positioned in a spaced opposed relationship from each other and having said means defining a driven member located in the space therebetween;

at least three piezoelectric driver assemblies positioned in a predetermined pattern on each of said first and second mounting means and positioned thereon to be directed towards each other and extending into the space between the first and second mounting means and in driving engagement with said means defining the driven member; each of said piezoelectric driver assemblies having an engaging member formed of a hard material and having a selected driving end at one end thereof and a driven end formed on the end opposite to said one end having said selected driving end, said one end of the engaging member being capable of selectively engaging and translating said means defining the driven member in response to a driving force applied to said one end;

at least three piezoelectric driving elements positioned between said mounting means and said driven end of said engaging member and positioned in a predetermined spaced, angular relationship to each other, said piezoelectric driving elements being capable of responding to an applied electrical signal having a predetermined frequency and an amplitude which varies between a first polarity and second polarity to expand and contract to change its geometrical dimensions, said piezoelectric driving element being responsive to an electrical signal having an amplitude of a first polarity to urge the engaging member into driving engagement with said means defining said driven member to apply a driving force thereto in a selected direction and being responsive to an electrical signal having an amplitude of a second polarity to withdraw the engaging member from driving engagement with said means defining said driven member; and means operatively coupled to each of said three piezoelectric driving elements on each of said first and second mounting means for selectively applying a said electrical signal to each of said piezoelectric driving elements for expanding and contracting one or more of said piezoelectric driving elements at the same time;

said electromechanical translation apparatus being responsive to said electrical signals being selectively applied to one or more of said a piezoelectric driving elements to urge said at least one engaging member into engagement with said means defining a driven member to apply a driving force thereon to incrementally translate said means defining said driven member in a selected direction along one of two or more predetermined axes.

25. The electromechanical translation apparatus of claim 24 further comprising a compliance means operatively coupled between said first and second mounting means for urging the engaging member into driving contact with said driven member.

26. The electromechanical translation apparatus of claim 25 wherein said means defining a driven member defines a planar member.

27. The electromechanical translation apparatus of claim 25 wherein said means defining a driven member defines a spherical segment having a surface which is equally distant from a geometrical center at all points.

28. A piezoelectric micropositioner comprising means defining a driven member which is adapted to be incrementally moved in a selected direction;

first and second mounting plates positioned in a spaced parallel opposed relationship from each other and having said means defining a driven member located in the space therebetween;

at least three piezoelectric driver assemblies operatively mounted in a predetermined pattern on each of said first and second mounting plates and positioned thereon to be directed towards each other and extending into the space between the first and second mounting plates and in driving engagement with said means defining the driven member, each of said piezoelectric driver assemblies having an engaging member formed of a hard material and having a selected driving end at one end thereof and a driven end formed on the end opposite to said one end having said selected driving end, said one end of the engaging member being capable of selectively engaging and translating said means defining the driven member in response to a driving force applied to said one end; and at least three piezoelectric driving elements positioned between one of said first and second plates and said driven end of said engaging member and positioned in a predetermined spaced, angular relationship to each other, said piezoelectric driving elements being capable of responding to an applied electrical signal having a predetermined frequency and an amplitude which varies between a first polarity and second polarity to expand and contract to change its geometrical dimensions, said piezoelectric driving elements being responsive to an electrical signal having an amplitude of a first polarity to urge the engaging member into driving engagement with said means defining said driven member to apply a driving force thereto in a selected direction and being responsive to an electrical signal having an amplitude of a second polarity to withdraw the engaging member from driving engagement with said means defining said driven member.

29. The piezoelectric micropositioner of claim 28 further comprising a compliance means operatively coupled between said first and second mounting plates for urging the engaging member into driving contact with said driven member.

30. The piezoelectric micropositioner of claim 29 wherein each of said piezoelectric driver assemblies further comprise a housing section operatively coupled between one of the first and second plates and the three piezoelectric driving elements for reacting the forces generated by the piezoelectric driving elements between the plate and the engaging member to produce the driving forces.

31. The piezoelectric micropositioner of claim 29 wherein each of the three piezoelectric driver assemblies is integral with one of the first and second mounting plates for reacting the forces generated by the the piezoelectric elements between the plate and the engaging member to produce the driving forces.

32. The piezoelectric micropositioner of claim 29 wherein said means defining a driven member defines a planar member.

33. The piezoelectric micropositioner of claim 29 wherein said means defining a driven member defines a spherical segment having a surface which is equally distant from a geometrical center at all points.

* * * * *